United States Patent [19]

Tsuchihashi et al.

[11] Patent Number: 4,955,654
[45] Date of Patent: Sep. 11, 1990

[54] END EFFECTOR

[75] Inventors: Akira Tsuchihashi, Nagareyama; Naoki Noguchi, Yokohama; Kesatoshi Kuraoka, Matsudo, all of Japan

[73] Assignee: National Space Development Agency of Japan, Tokyo, Japan

[21] Appl. No.: 286,866

[22] Filed: Dec. 20, 1988

[30] Foreign Application Priority Data

Dec. 21, 1987 [JP] Japan ................................. 62-321298

[51] Int. Cl.⁵ .......................... B64G 4/00; B66C 1/12
[52] U.S. Cl. ................................... 294/86.4; 294/907; 901/34;39; 244/161
[58] Field of Search ...................... 294/86.4, 907, 67.5, 294/81.4, 81.41; 901/33, 34, 39, 32, 35, 46; 244/158 R, 161; 33/DIG. 13

[56] References Cited

U.S. PATENT DOCUMENTS 4,105,241 8/1978 Mee ..................................... 294/86.4
4,549,425 10/1985 Wisebaker et al. ............. 294/907 X
4,577,513 3/1986 Harwood et al. ................. 901/34 X
4,696,501 9/1987 Webb ............................... 294/907. X
4,726,729 2/1988 Olson et al. ...................... 294/907 X
4,738,583 4/1988 Macconochie et al. .......... 901/33 X

FOREIGN PATENT DOCUMENTS

1337250 9/1987 U.S.S.R. ............................... 294/907

Primary Examiner—Margaret A. Focarino
Assistant Examiner—Dean J. Kramer
Attorney, Agent, or Firm—Antonelli, Terry, Stout & Kraus

[57] ABSTRACT

An end effector secured to an front end of a manipulator of a remote manipulator system and having a function for clamping dedicated objects, wherein a force (or torque) applied to the end effector at the time of clamping the dedicated object is detected so that a driving portion of the end effector is feedback-controlled in order to protect the end effector from being applied with a force (or torque) exceeding a predetermined level.

11 Claims, 12 Drawing Sheets

END EFFECTOR

BACKGROUND OF THE INVENTION

The present invention relates to an end effector, and more particularly, to an end effector suitably used for clamping an object which is located in such a manner that the position or angle thereof is relatively unstable, for example in outer space.

A, as a standard end effector (SEE) for use in a remote manipulator system (RMS) for space crafts is disclosed in U.S. Pat. No. 4,105,241.

The conventional end effector of the type described above is controlled by a sequence of steps such that a dedicated object to be clamped, called a "Grapple fixture", first captured, is pulled in, and then is rigidized. Once the capturing operation is started, a payload mass up to of 30t needs to be captured in a short time against an inertial force thereof. If a misalignment between the position and angle of the end effector and those of the grapple fixture is too large, the above-described inertia force produces an extremely large force (or a torque). Therefore, a problem arises that such excessive force accelerates the degradation of a lubricative function in a vacuum state of the elements for transmitting the clamping force, such as a driving system, rotary rings, ball screws and so forth, and thereby the life of the same is shortened because the use of lubricants is extremely restricted in the space.

On the other hand, since an RMS has a great overall size exceeding 10m and involves a narrow visual range, it is difficult to align the orientation of the RMS with the center of gravity of the payload. Therefore, an excessive force needs to be applied to the SEE for the purpose of capturing grapple fixtures.

OBJECTS AND SUMMARY OF THE INVENTION

An object of the present invention is to protect an end effector from an excessive force (or torque) when the end effector clamps a grapple fixture.

An object of the present invention is to provide an end effector capable of preventing an object having a large inertial moment from abruptly changing its velocity during a process of capturing the object with the use of the end effector.

Another object of the present invention is to provide an end effector capable of completing the capture of an object in a short time while restraining the capturing speed so as to prevent an excessive force from acting upon the end effector, the excessive force caused by an excessive misalignment or a relative velocity difference between the object and the end effector.

Another object of the present invention is to provide an end effector capable of having a long life.

In order to achieve these objects, according to the present invention, a sensor for detecting a force (or torque) to be applied to an end effector is provided, and the speed of a driving device of an end effector is controlled in such a manner that the result of detection obtained from the sensor is fed back to a control circuit for the driving device of the end effector so that the force (or torque) to be applied to the end effector is limited and does not exceed a predetermined level.

DETAILED DESCRIPTION OF PREFERRED EMBODIMENT

Figure 1:
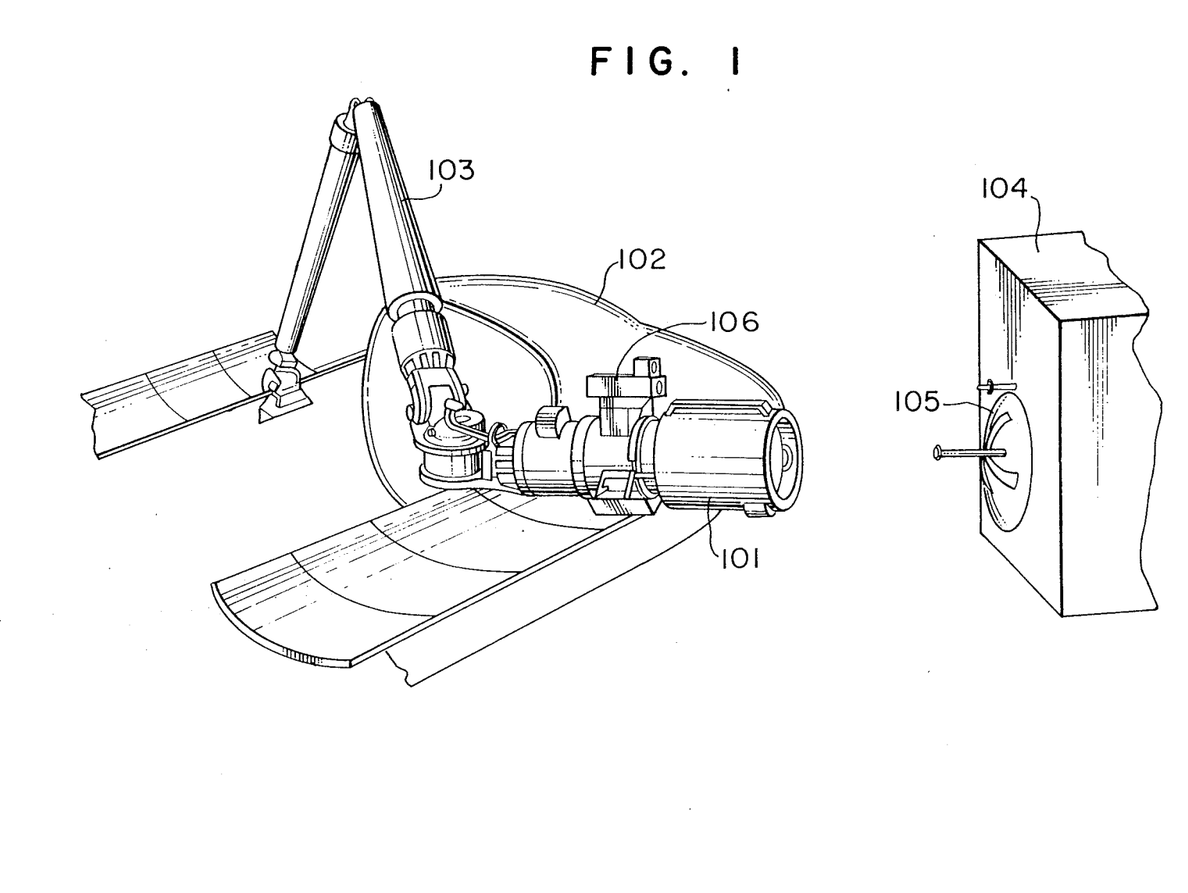
FIG. 1 is a view which illustrates an end effector to which the present invention is subjected and a grapple fixture.

FIG. 1 illustrates an end effector to which the present invention is embodied, in which reference numeral 101 represents a clamping portion; 102, a space working craft; 103, a RMS (Remote Manipulator System) having the degree of freedom of 6; 104, a payload to be handled by the RMS 103; 105, a grappled body to be mounted on the payload 104; and numeral 106 a TV camera which produces image which is observed by an operator who operates the RMS 103. The clamping portion 101 can clamp and hold the payload 104 by capturing and fixing the grappled body 105. The RMS 103 having 6 degrees of freedom and mounted to the space working craft 103 comprises a long arm exceeding 10m in overall length. It carries the clamping portion 101 and exhibits a characteristic capable of capturing the payload 104 even if the positional precision of the RMS is not excellent. Thus, the payload 104 which has been held by the clamping portion 101 can be, by use of the RMS 103, located at an optional position in an optional direction.

Figure 2:
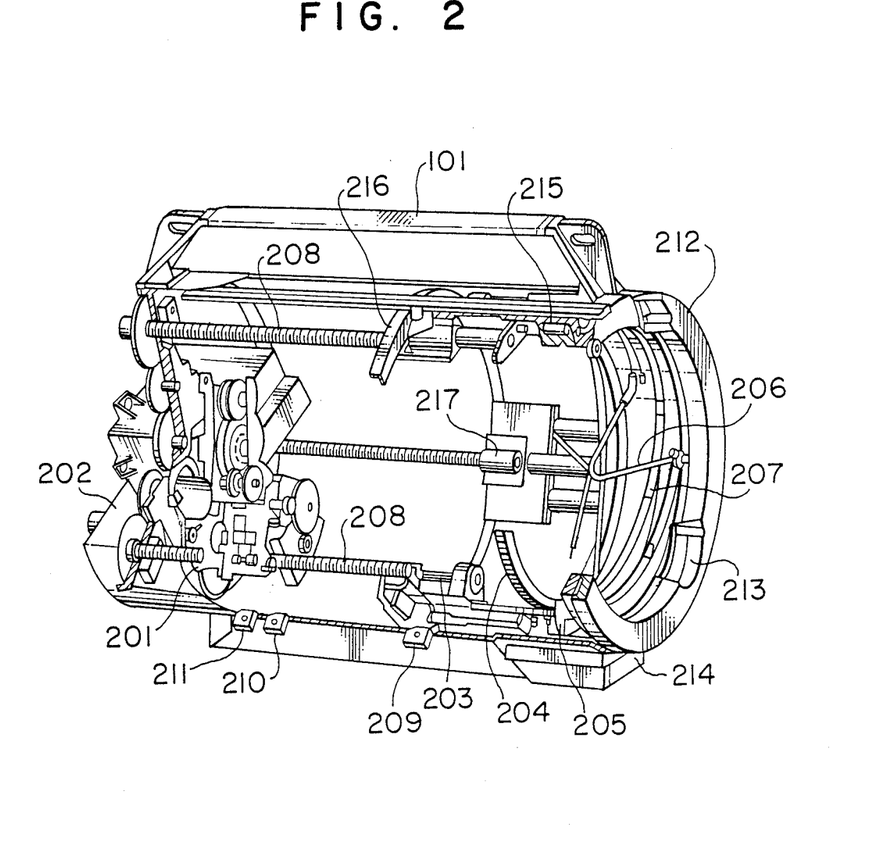
FIG. 2 is a view which illustrates the structure of a clamping portion of the end effector.

FIG. 2 is a view as shown in FIG. 1 of the document NASA-CP-2221, "THE DESIGN AND DEVELOPMENT OF AN END EFFECTOR FOR THE SHUTTLE REMOTE MANIPULATOR SYSTEM" and the principle thereof is disclosed in U.S. Pat. No. 4,105,241, in which the major structure of the clamping portion 101 is shown. That is, reference numeral 201 represents a driving system; 202 a back plate; 203 a ball spline; 204 a snare drive gear; 205 a rotary ring; 206 snare cables; 207 a stationary ring, 207 a stationary ring; 208 ball screws; 209 a status switch (1); 210 a status switch (2); 211 a status switch (3); 212 an end plate; 213 a glove; 214 an electric connector; 215 a support structure; 216 a carrier, and 217 a ball nut.

The clamping portion 101 is driven by a DC brushless motor in the driving system 201 mounted on the back plate 202. The output torque from the motor drives the rotary ring 205 secured to the snare drive gear 204 via a spur gear assembly (omitted from illustration) in the driving system 201 and the ball spline 203. One end of each of the three snare cables 206 is secured to the rotary ring 205, while each other end of the same is fitted to the stationary ring 207 disposed outside the rotary ring 205 via the support structure 215. Therefore, the snare cables 206 are rotated by the rotation of the rotary ring 205 as to open and close a loop formed by the three cables. On the other hand, the output torque from the motor also rotates the three ball screws 208 via a spur gear in the driving system 201. The transmission of the output torque from the motor is switched, by a clutch and a brake (omitted from illustration) in the driving system 201 between the ball spline 203 and the ball screw 208. A carrier 216 is fastened to the front end of the ball screw 208 with a ball nut 217, whereby the carrier moves back and forth in association with the rotation of the ball screws 208. Since the rotary ring 205 and the stationary ring 207 to which the snare cables 206 are fitted are secured to the carrier 216, the snare cables 206 are pulled in or pulled out by the rotation of the ball screws 208. The movement of the carrier 216 can be confirmed by the status switches 209 to 211. The open side (remote from the back plate 202) of the clamping portion 101 is provided with the end plate 212, this surface of which serves as the interface surface with the grappled body 105. The glove 213 is provided for the end plate 212, this glove 213 having a function to lock the rotation of the grappled body 105. On the other hand, the end plate 212 is provided with the electric connector 214 so that an electrical interface with the grappled body 105 and the play load 104 can be obtained.

Figure 3:
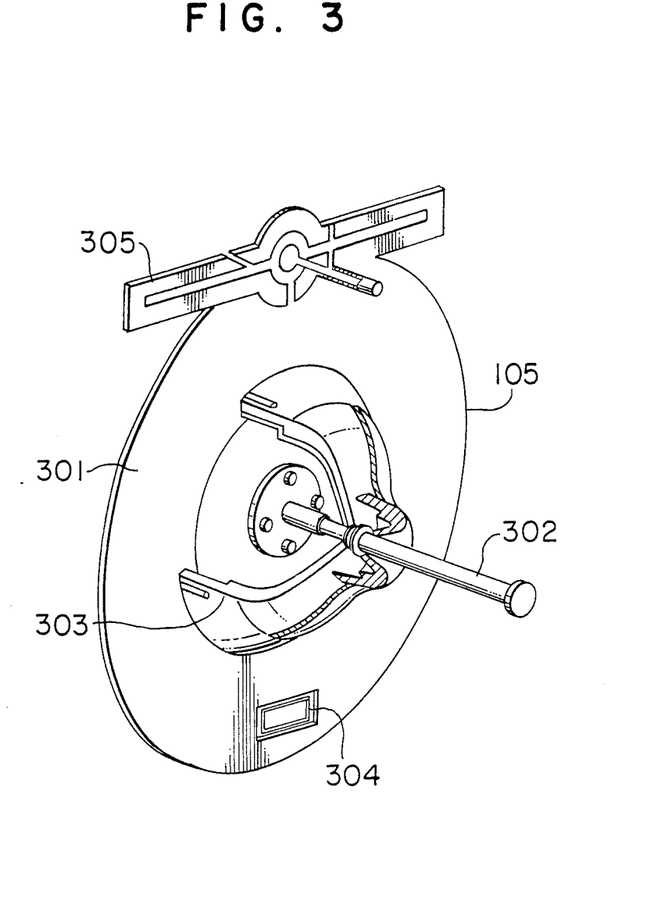
FIG. 3 is a view which illustrates the structure of a grappled body.

FIG. 3 illustrates the major structure of the grappled body 105, wherein reference numeral 301 represents a base plate; 302 a grapple shaft; 303 a guide arm; 304 an electric connector; and 305 a grapple target.

FIG. 4 illustrates an operation of the clamping portion 101, wherein reference numeral 101 represents a clamping portion; 105 a grappled body; 205 a rotary ring; 206 a snare cable; 207 a stationary ring; and 302 a grapple shaft. FIGS. 4a and 4b illustrate a state where a capture is started, FIGS. 4c and 4d illustrates a capturing process, and FIG. 4e illustrates a state where the capture is completed.

Next, an operation of the clamping portion 101 will be described with reference to FIGS. 1, 2, 3 and 4.

Figure 4A:
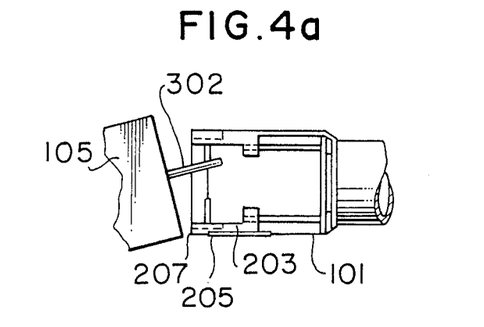
FIGS. 4a–4e are views which illustrates a clamping operation for the end effector.
Figure 4B:
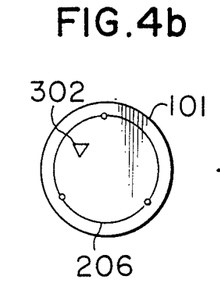
Figure 4C:
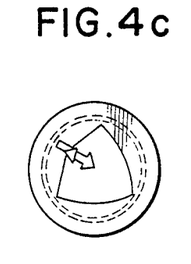
Figure 4D:
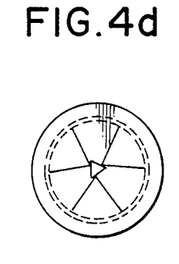
Figure 4E:
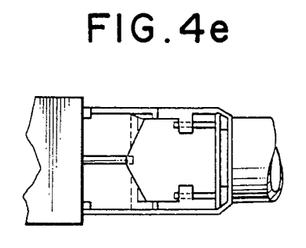

Referring to FIG. 4a, the carrier 216 of the clamping portion 101 shown in FIG. 2 is completely pulled out before the operation start. In addition, the snare cable 206 is accommodated in the rotary ring 205 and the stationary ring 207. An operator positions the clamping portion 101, observing the grapple target 305 shown in FIG. 3 through the TV camera 106 of the RMS 103 by operating the RMS 103 shown in FIG. 1 in order to introduce the grapple shaft 302 of the grappled body 105 fastened to the payload 104 into the space of the opened portion of the clamping portion 101. This state is shown in FIG. 4b. Next, the rotary ring 205 rotates, and the three snare cables 206 start rotation and approach the grapple shaft 302. This state is shown in FIG. 4c. When the rotary ring 205 has been completely rotated and the snare cables 206 tightened around the grapple shaft 302, the grapple shaft 302 is positioned at the central portion of the clamping portion 101. This state is shown in FIG. 4d. Next, the ball screw 208 rotates and pulls the snare cable 206 with the carrier 216 toward the clamping portion 101. As a result, the end plate 212 of the clamping portion 101 and the base plate 301 of the grappled body 105 are brought into close contact with each other so that the guide arm 303 is set to the glove 213. Then, the grappled body 105 is fixed in all of the directions designated by the six degrees of freedom as shown in FIG. 4e.

Figure 5:
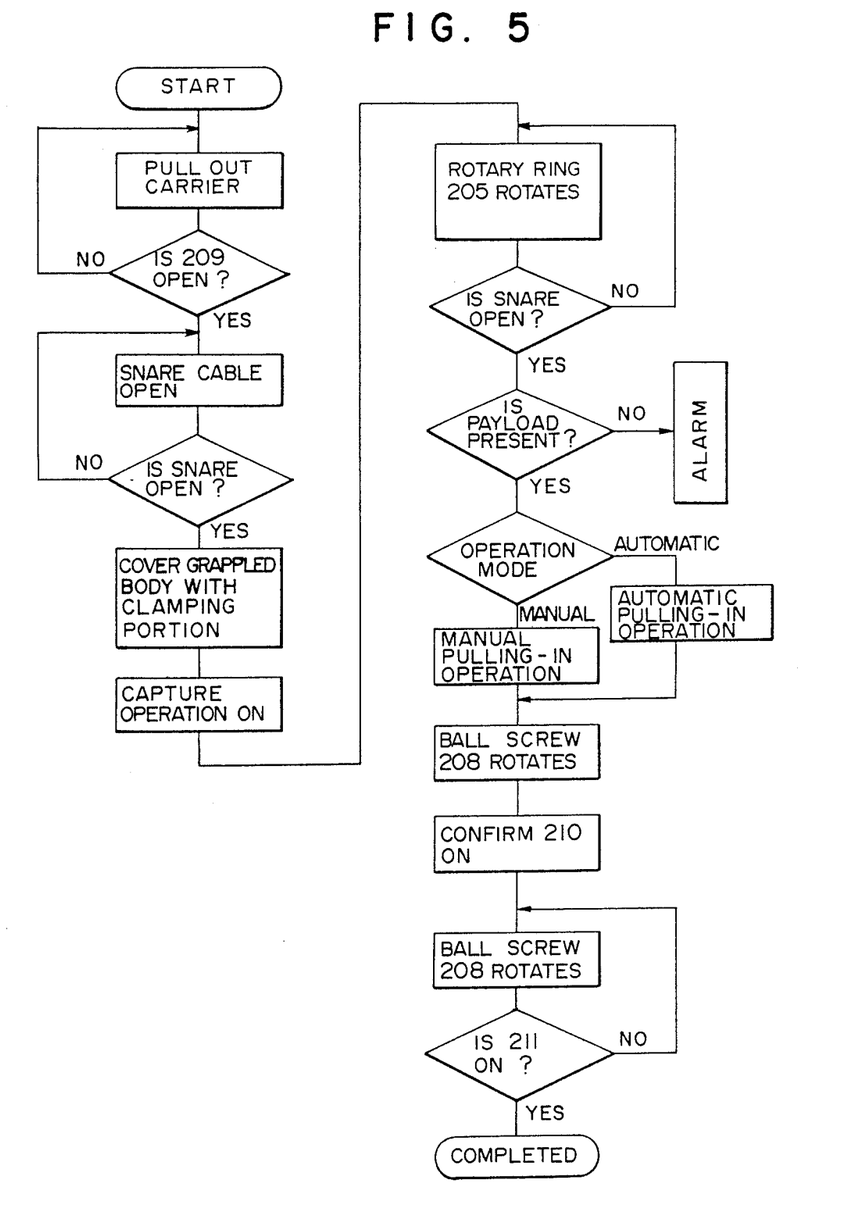
FIG. 5 is a view which illustrates a control sequence for an end effector when the present invention is not used.

The above operation, when the present invention is not employed, is controlled with a sequence shown in FIG. 5. First, an operator confirms that the carrier 216 has been completely extended upon a signal "END EFFECTOR EXTEND" from the status switch (1) 209, while the operator also confirms that the snare has been completely opened upon a signal "SNARE OPEN" from the status switch (4) (omitted from illustration). Next, the operator positions the clamping portion 101 with the RMS 103, and confirms that the grapple shaft 302 has been positioned within the opened portion of the clamping portion 101 through the TV camera 106, and then a switch for the rotary ring 205 is switched on so that the rotary ring 205 is rotated. When the rotary ring 205 has completely rotated by 80°, the status switch (5) (omitted from illustration) is switched on so that a signal "SNARES CLOSE" is output. In this state, when the snare cables 206 tighten up the grapple shaft 302, the spring at the front end of the snare cable 206 operates a status switch (6) (omitted from illustration) with the tension of the snare cable 206 so that a signal "PAYLOAD PRESENT" is output. As a result, the process is shifted into a pulling in operation by these two ANDs when logical AND between these two signals are established. In this state, when the operation mode is an automatic one, the pulling-in is automatically started, while in a manual mode, the pulling-in is started in response to the manipulation by the operator. Thus, the ball screw 208 is rotated, and the carrier 216 is pulled in. Thus, when the carrier 216 has been pulled in by a state where the end plate 212 of the clamping portion 101 and the base plate 301 are immediately brought into contact with each other, the status switch (2) 210 is switched on so that the signal is outputted. Then, the carrier 216 is pulled in, and when the same has been completely pulled in, a signal is outputted from the status switch (3) 211. Thus, the clamping operation is completed.

As described above, the operation of the clamping portion 101 is controlled with the sequence shown in FIG. 5 without using the present invention, a large force (or torque) can be possibly applied to the end effector at the time of performing the capture and pulling operation. Consequently the life of the end effector is shortened.

Then, a control block diagram for an end effector according to an embodiment of the present invention will now be described with reference to FIG. 6.

This embodiment illustrates a case where a feedback is performed in a control circuit for controlling the driving system for the clamping portion 101 of an end effector by a servo control upon detection of, with a sensor, a force (or torque) applied to a snare cable. Reference numeral 601 represents a relay; 602 an amplifier; 603 a servo motor; 604 a speed sensor; 605 a gain regulator; reference numeral 606, a reduction gear; 201 a driving system; 205 a rotational ring, 206 a snare cable; and 607 a force sensor.

According to this embodiment, when the process in the capture process is shifted into a state shown in FIG. 4c, the relay 601 is turned on in response to a signal representing a start of a capture operation shown in FIG. 5. As a result, a rated force control signal of is, via the amplifier 602, inputted to the driving system 201 as a speed control signal $\dot{Q}_I$. A rotational speed signal $\dot{Q}_M$ outputted from the servo motor 603 is detected by the speed sensor 604, and is fed back via the gain regulator 605. The output $\dot{Q}_M$ from the servo motor 603 drives the rotary ring 205, and thereby rotates the snare cables 206. When each rotational angle Qc of the snare cables 206 reaches an angle $Q_L$ due to its rotation, the snare cables 206 start the contact with the grapple shaft 302, and the tension of the snare cables 206 thereby becomes enlarged. The force sensor 607 is structured with a strain gauge fitted to a support structure for the snare cable 206 shown in FIG. 2.

Figure 7:
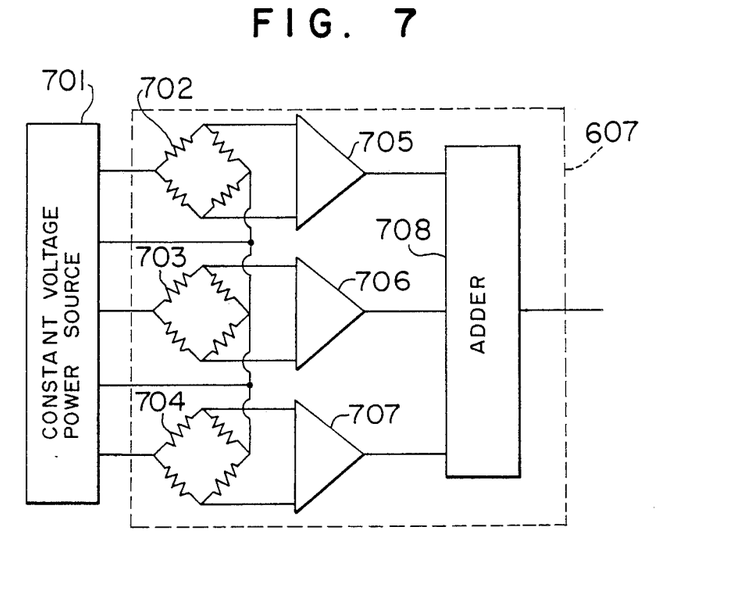
FIG. 7 is a view which illustrates an example of the structure of a force sensor.

FIG. 7 illustrates the structure of this force sensor, wherein reference numeral 701 represents a rated voltage power source; 702, 703 and 704 represent strain gauges put on the support structures of the three snare cables 206 shown in FIG. 2; 705, 706 and 707 strain amplifiers of the strain gauges 702, 703, and 704; and 708 an adder.

According to the force sensor shown in FIG. 7, the forces effected upon the three snare cables are detected by the strain gauges 702, 703, and 704, are amplified by the strain amplifiers 705, 706, and 706, and signals outputted therefrom are added by the adder 708 so that a signal is outputted from an output circuit as a force sensor signal.

Figure 8:
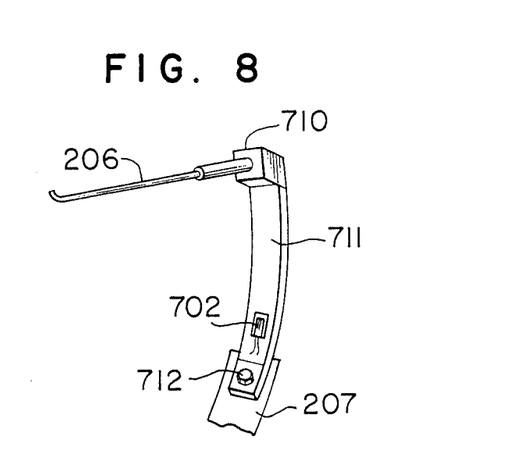
FIG. 8 is a view which illustrates a state where the force sensor is mounted.

FIG. 8 illustrates a state where the strain gauge is fitted to the support structure of the snare cable 206 shown in FIG. 2. Reference numeral 206 represents snare cables; 702 a strain gauge; 710 a cable fastener; 711 a support structure; and 712 a fixing bolt. As shown in FIG. 2, one end of the snare cable is fitted to the rotary ring 205, while the other end of the same is fitted to the stationary ring 207. FIG. 8 illustrates in detail this state. The cable fastener 710 fixes the snare cable 206 to the support structure 711, and this support structure is secured to the stationary ring 207 with the fastening bolt 712.

The strain gauge 702 is put on the surface of the support structure 711 so that the support structure 711 generates a bending stress which corresponds to the stress of the snare cable 206 when this snare cable 206 clamps the grapple shaft 302. As a result, this bending stress is measured as a stress by the strain gauge 702. Since the thus measured stress is in proportion to the above-described bending stress, the force effected upon the snare cable 206 can be measured by detecting the stress measured by the strain gauge 702.

Figure 6:
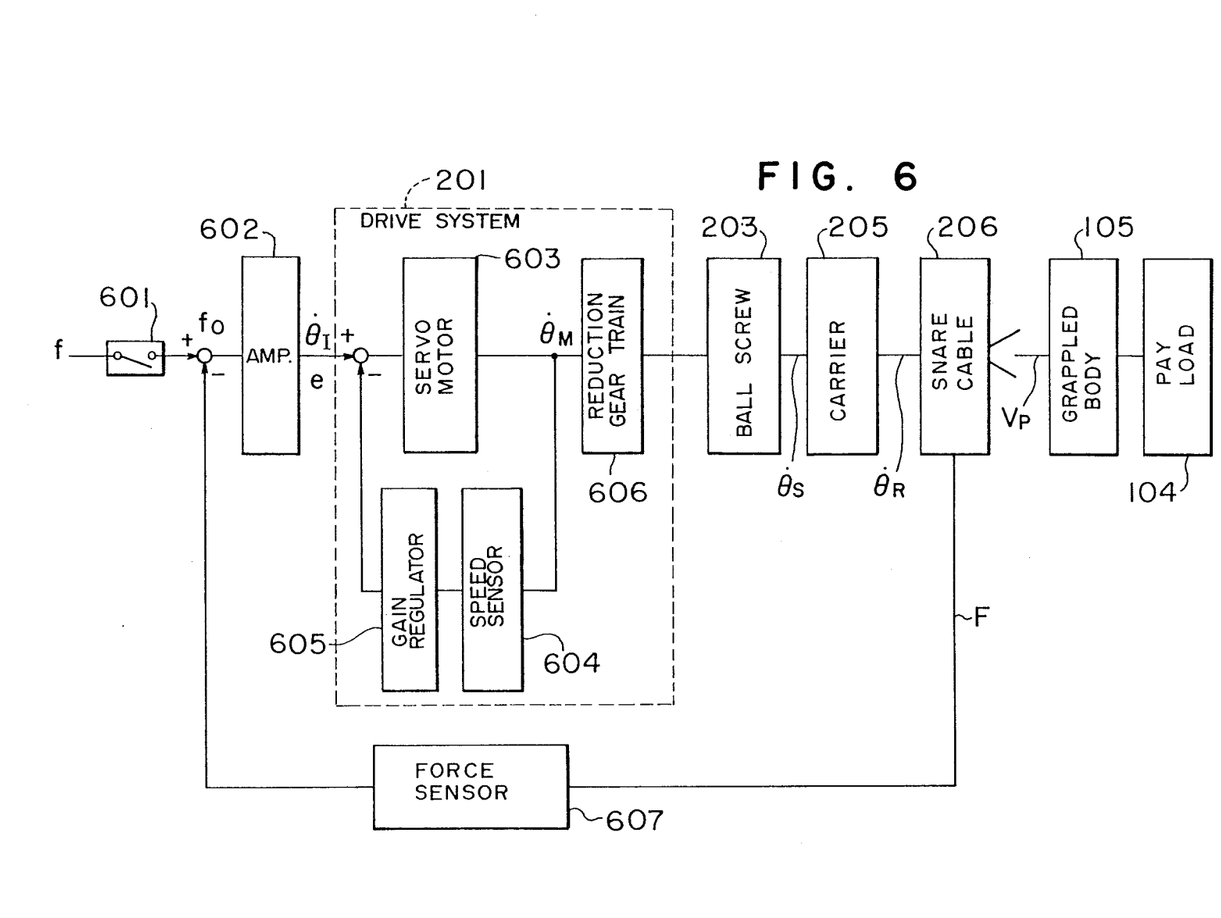
FIG. 6 is a control block diagram for an end effector according to an embodiment of the present invention.
Figure 9A:
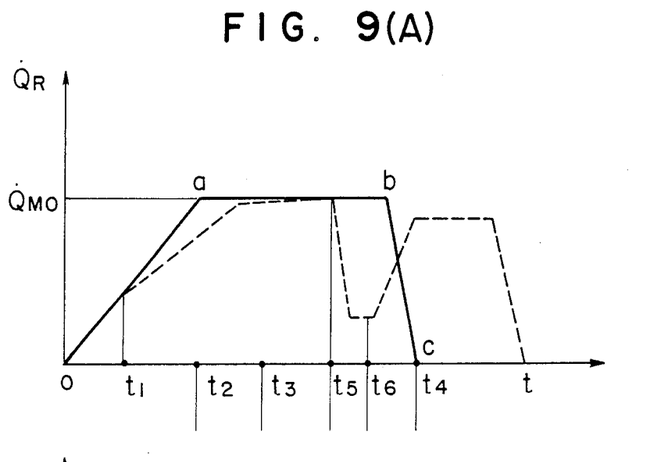
FIGS. 9(A), (B), and (C) graphic views which illustrate, time variations in rotational speed $Q_R$, force F, and speed $V_p$, respectively.
Figure 9B:
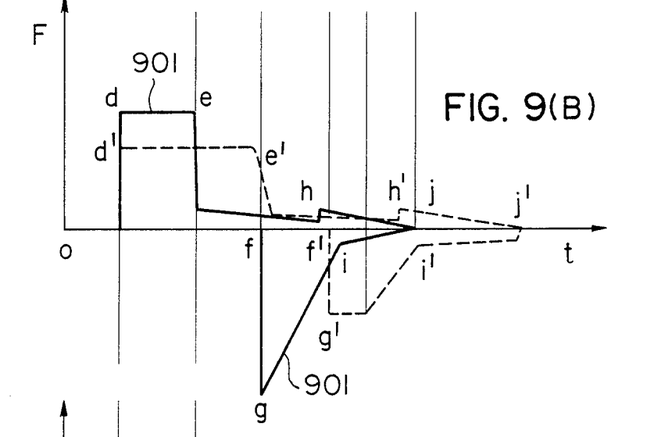
Figure 9C:
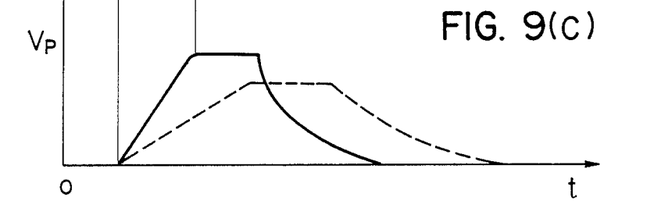

FIG. 9 illustrates changes in the rotational speed $\dot{Q}_R$ of the rotary ring 205 shown in FIG. 6, in the force F effected upon the snare cable 206, and in the speed $V_P$ of the payload 104, the solid line indicating the result of the control shown in FIG. 5 to which the control by the present invention is not applied while the chain line indicating the result of the control in which the feed back of the force by the force sensor 607 is applied.

In the case wherein the present invention is not applied, the rotary ring 205 is rotated simultaneously with the signal generation due to the capturing operation shown in FIG. 5, the rotational speed reaches $\dot{Q}_{MO}$ at a, then it turns off the signal generation after the rotary ring is uniformly rotated to f, and stops at c.

In this case, the value of force F of the snare cable 206 due to the operation of the rotary ring 205, measured by the strain gauge 702 can be changed greatly, depending upon the relative position and relative speed between the payload 104 and the clamping portion 101, and the mass of the payload 104.

When one of the three snare cables 206 comes into contact with the grapple body 302 after time period $t_1$ from the start of rotation of the rotary ring 205, the value measured by the strain gauge 702 is raised. Since the increase rate of the rotational speed of the snare cable 206 becomes constant henceforth, a constant force is applied to the payload 104 so that this payload 104 is accelerated. As a result, a substantially uniform force is executed upon the one of the snare cables 206. When the rotational speed of the snare cable 206 becomes constant after time period of $t_2$, the speed of the payload 104 also becomes constant as shown in FIG. 9(C). Therefore, the force applied to the one of the snare cables 206 is reduced as designated by the line 901. At time $t_3$, the grapple shaft 302 comes into contact with another one of the three snare cables 206, and the value measured by the strain gauge 703 put on another support structure (omitted from illustration) is rapidly increased as designated by the line 902. As a result, an excessive force is also applied to the ball screw 203 and the bearings respectively in addition to the snare cable 206 shown in FIG. 2. It leads to a fact that an excessive decrease in the life of, in particular, space equipments occurs.

When the great resistance as designated by the line 902 measured by the strain gauge 703 is generated, the payload 104 is rapidly braked as shown in FIG. 9(c), causing the payload 104 to be captured by the three snare cables.

On the other hand, the result obtained from a case in which the control block diagram according to the present invention shown in FIG. 6 is applied to the device shown in FIG. 2 is shown by the short dashed line in FIG. 9.

The characteristics of the control performed by the control block diagram shown in FIG. 6 are illustrated by the short dashed line shown in FIG. 9(A). First, when one of the snare cables 206 comes into contact with the grapple shaft 302 after time period $t_1$ from generation of a signal which represents the capture action, the rise in speed of the rotary ring 205 is restricted by the feedback of the force sensor 607. As a result, a time period in which the another one of the three snare cables comes in contact with the grapple shaft 302 is changed from $t_3$ to $t_5$. Next, the rotary ring 205 is decelerated by the feedback of the force sensor 607, and is moved slowly by the reduction of the speed of the payload 104 so that the capture is completed after the speed reduction of the payload 104. Therefore, time taken to complete the capture becomes longer.

As a result, the force applied to one of the snare cables 206 is changed as d-e-h-j to d'-e'-h'-j' as shown in FIG. 9(B), and the maximum value of the force is decreased. Furthermore, the force applied to other one of the snare cables 206 is changed from f-g-i-j to f'-g'-i'-j', and the maximum value of the force is also decreased. As a result, the force to be applied to the transmission elements such as the snare cables 206, the ball spline 203 and the reduction gear 606 can be decreased so that the life of these transmission elements can be prolonged.

Figure 10:
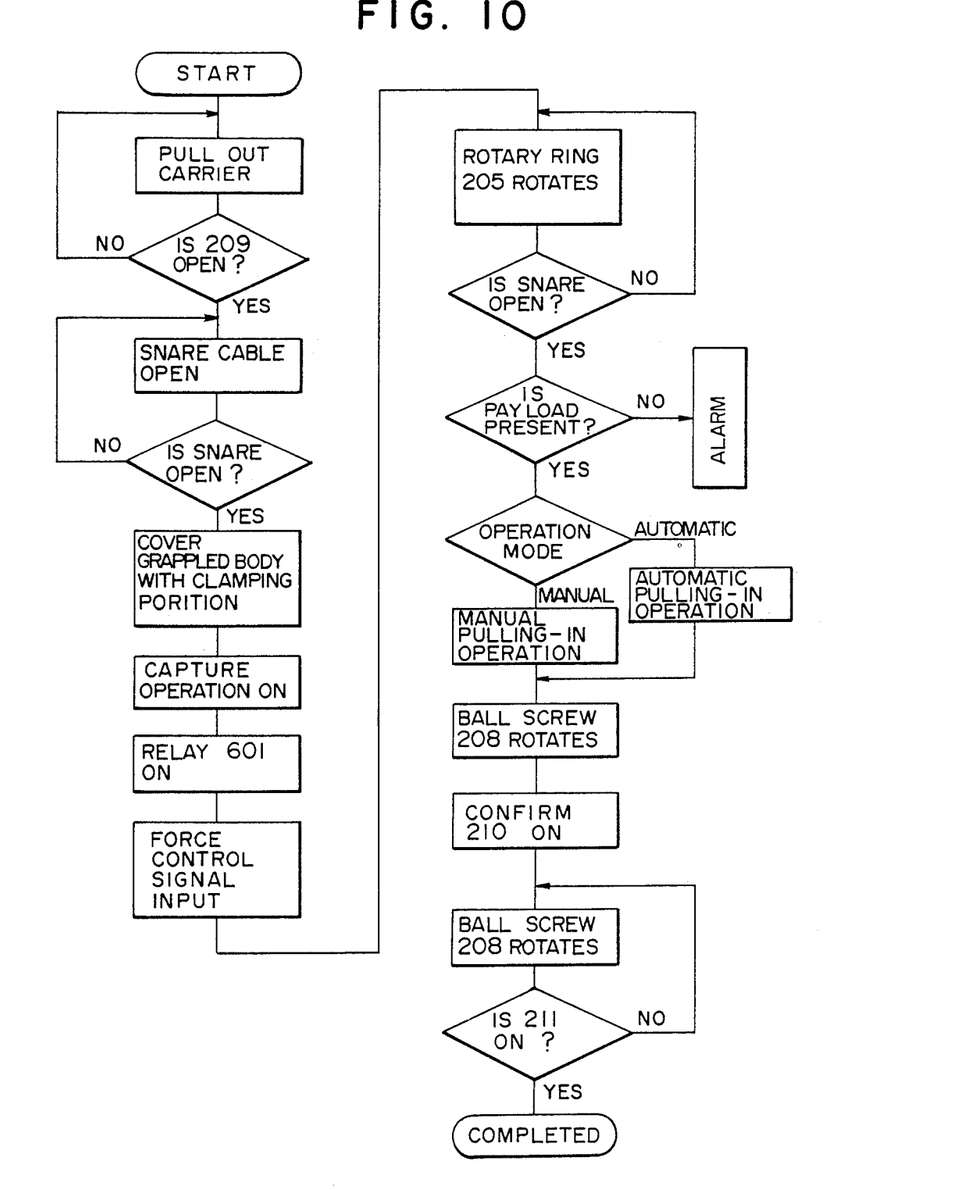
FIG. 10 is a view which illustrates a control sequence for an end effector when an embodiment of the present invention is used.

FIG. 10 illustrates a sequence for the control by the control block diagram shown in FIG. 6. That is, in FIG. 10, sequence steps for the action of the relay 601 and the same for input of a control signal are added to the sequence stops shown in FIG. 5 in which the control block diagram shown in FIG. 6 is not applied.

Although, a case where the strain gauge 702 is applied to the support structure 711 is illustrated in FIGS. 7 and 8, the same may be applied to the shaft of the ball spline 203 for obtaining the similar effect.

Figure 11:
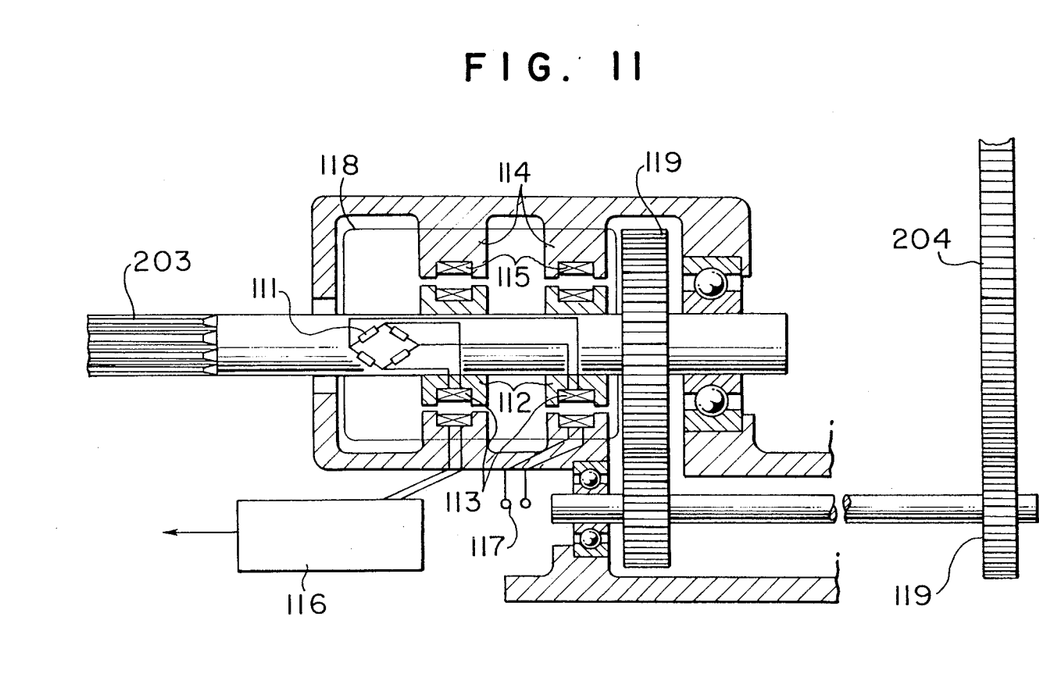
FIG. 11 is a view which illustrates an example of the structure of the force sensor.

That is, referring to FIG. 11, reference numeral 203 represents the ball spline shown in FIG. 2; 204 the snare drive gear also shown in FIG. 2; 111 a bridge circuit for strain gauges applied to the ball spline 203; 112 a rotatable core; 113 a rotary coil; 114 a stationary core; 115 a stationary coil; 116 an arithmetic circuit; 117 an input terminal; 118 a magnet shield case; and 119 a gear train.

An operation of the structure shown in FIG. 11 will be then described. When the ball spline 203 is rotated, a torque is transmitted to the snare drive gear 204 by the gear train 119. When the snare cable 206 (omitted from illustration) connected to the snare drive gear 204 comes into contact with the grapple shaft 302, this contact is detected by the strain gauge block 111 as a shaft torque. A power source is supplied to the strain gauge block 111 from the input terminal 117 via the stationary coil 115 and the rotary coil 113. Furthermore, a signal representing a torque is taken out from the strain gauge block 111 via the rotary coil 113 and the stationary coil 115, and this signal is supplied to the arithmetic circuit 116. In order to protect these signal circuits, a magnet shield case 118 is provided in the case.

The arithmetic circuit 116 is provided for using the torque signal from the strain gauge block 111 in the force feedback circuit shown in FIG. 6.

In the above embodiment, although the force feedback control is used for the capturing action performed by the end effector, this force feedback control can be similarly used for the pulling in operation of the end effector.

Figure 12:
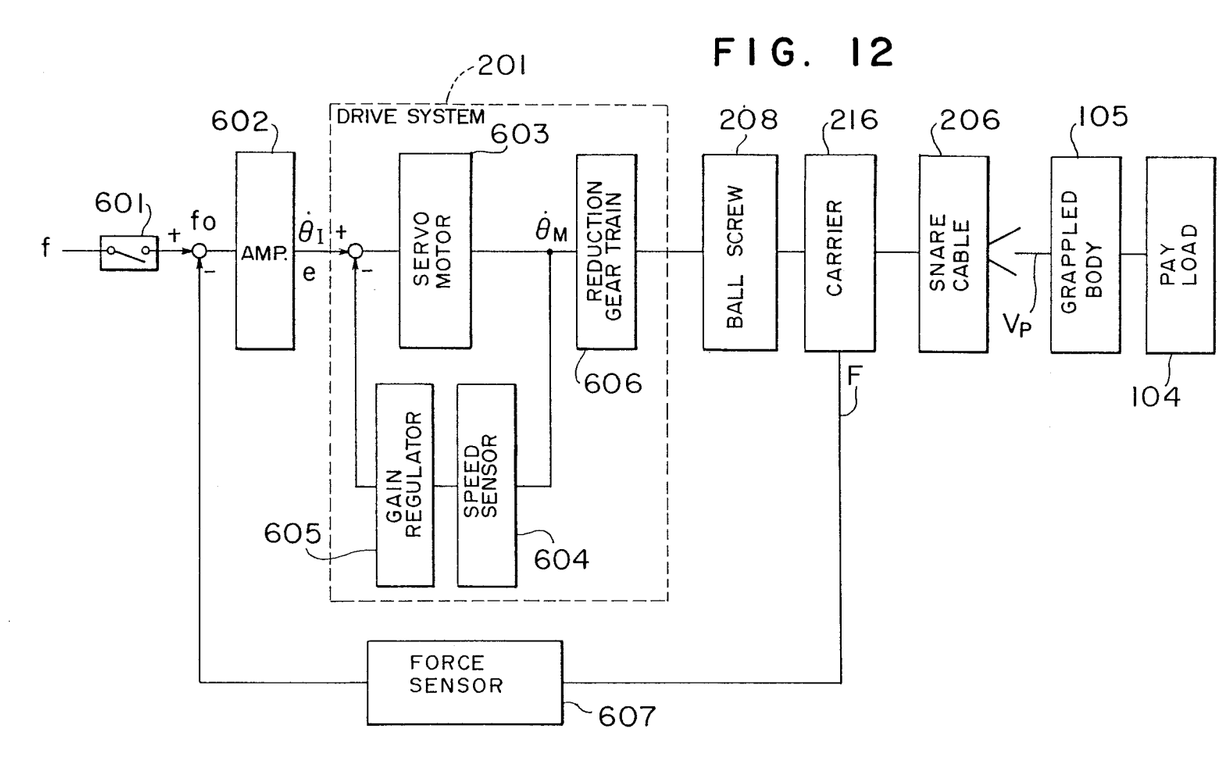
FIG. 12 is a control block diagram for an end effect according to other embodiment of the present invention.

An embodiment of a control block diagram for the end effector in this case is shown in FIG. 12. This embodiment illustrates a case in which the force (or torque) applied to the moving carrier 216 in the clamping portion 101 shown in FIG. 2 at the time of pulling in operation of the end effector is detected by the force sensor 607 so that the force feedback control is performed. When the end effector performs the pulling in operation, the power of the driving system 201 is, as shown in FIG. 12, transmitted to the carrier 216 via the ball screw 208. As a result, the snare cable 206 connected to the carrier 216 is pulled into the clamping portion 101 together with the carrier 216. This embodiment is characterized in that the force sensor 607 is fitted to this carrier 216 so that the force to be applied to the carrier 216 at the time of pulling in operation is detected. Then, the result of the detection is fed back for controlling the pulling in operation performed by the end effector. Other factors in FIG. 12 are the same as those shown in FIG. 6, and the description thereof omitted.

Figure 13:
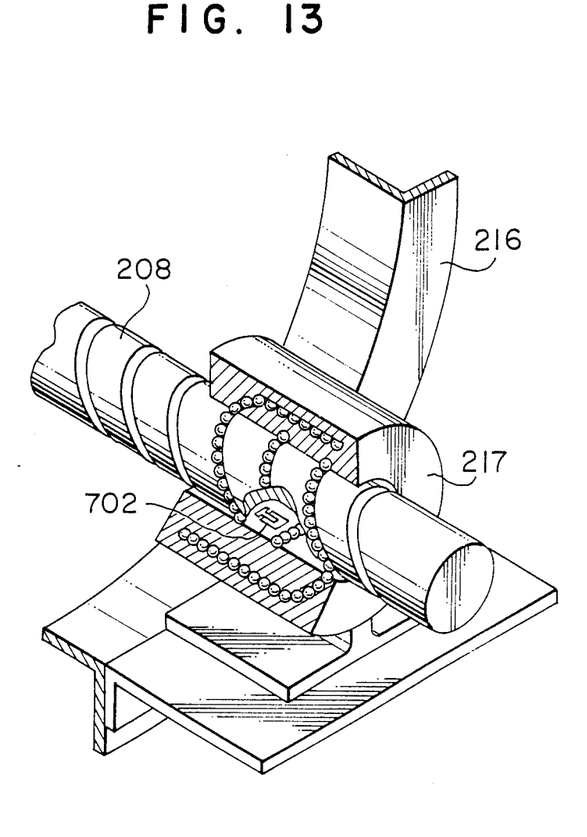
FIG. 13 is a view which illustrate other example of the state where the force sensor is mounted.

FIG. 13 illustrates an example in which the force sensor is mounted to the carrier 216. As the force sensor, the strain gauge 702 shown in FIGS. 7 and 8 is also used, this strain gauge 702 being embedded in the ball nut 217 which connects the carrier 216 with the ball screw 208. When the end effector performs the pulling in operation, the ball screw rotates, causing the carrier 216 to be pulled in. As a result, the force applied to the carrier 216 is measured by the strain gauge 702 as a strain.

Furthermore, as an alternative to the direct detection for the force (or torque), current i passing through a servo motor which serves as a power source, may be detected for controlling the force (or torque) within a predetermined level by performing feedback control of the current i since torque $\tau$ and current i are in such a relationship as $\tau = Ki$ (wherein, k represents a proportional constant).

As described above, a large shock is given a capturing mechanism immediately before the capture since a relative speed is applied to the payload during the capturing process when an object located in the space is intended to be captured. However, the present invention can prevent the generation of the above-described shock.

This technology, in principle, differs from a force feedback system for positioning apparatus, in which a force is detected and a positioning corresponding to a grapple body is performed, and another force feedback system in which the degree of opening of the clamping device is controlled in order to protect the grappled body from damages.

That is, the control performed for controlling the positioning or the degree of opening is usual position control. However, in the present invention, such position control is not performed, and only a speed control is performed.

According to the present invention, since the load applied to an end effector can be controlled so as to be set below a predetermined value, the load to be applied to the elements for transmitting a clamping force of the end effector can be reduced so that the use life of the end effector can be prolonged.

We claim:

1. An end effector secured to a front end of a manipulator arm in a remote control system for clamping an object, comprising:

capturing means for capturing said object, said capturing means including a centralizing means for guiding said object to a center of said capturing means, said centralizing means guiding said object through movement in at least three directions, and means for pulling said object into said capturing means once said object has been guided to said center of capturing means;

driving means for generating power for driving said centralizing means;

transmission means for transmitting said driving power generated by said driving means to said centralizing means;

means for detecting at least one of a force and a torque applied to said centralizing means, said detecting means having at least three strain gauges provided respectively at three different positions on said centralizing means and a receiving/transmitting means for receiving signals indicative of at least one of said force and torque from said at least three strain gauges and for transmitting detection signals indicative of at least one of said force and torque being applied to said centralizing means; and means for controlling an output from said driving means, wherein said control means is continuously responsive to said detection signals so as to continuously control said output from said driving means, thereby restraining a force of said centralizing means acting upon said object.

2. An end effector according to claim 1, wherein said centralizing means comprises a stationary ring, a rotary ring, and three snare cables each having one end which is secured to said stationary ring and the other end secured to said rotary ring.

3. An end effector according to claim 1, wherein said control means controls said output from said driving means so as to maintain said detection signals within a predetermined level.

4. An end effector secured to a front end of a manipulator arm in a remote control system and having a function for clamping an object, comprising:
   capturing means for capturing a grappled body provided to said dedicated object said capturing means including a centralizing means for guiding said object to a center of said capturing means, said centralizing means guiding said object through movement in at least three directions, and means for pulling said object into said capturing means once said object has been guided to said center of capturing means;
   driving means for generating power for driving said capturing means;
   transmission means for transmitting said driving power generated by said driving means to said capturing means;
   means for detecting at least one of a force and a torque applied to said capturing means, said detection means including a plurality of strain gauges and means for amplifying outputs from said plurality of strain gauge, wherein said detection means continuously produces detection signals indicative of at least one of said force and said torque during operation of said capturing means; and
   means for controlling the output from said driving means, wherein said control means receives said detection signals from said detection means continuously during operation of said capturing means so as to continuously control an output from said driving means, thereby restraining a force of said capturing means acting upon said object.

5. An end effector according to claim 4, wherein said capturing means comprises a stationary ring, a rotary ring, and three snare cables each having one end which is secured to said stationary ring and the other end secured to said rotary ring; and
   said transmission means includes gears, a ball spline, and a snare drive gear for transmitting said driving power generated by said driving means to said rotary ring.

6. An end effector according to claim 4, wherein said control means controls said output from said driving means so as to maintain said detection signals within a predetermined level.

7. An end effector secured to a front end of a manipulator arm in a remote control system for clamping an object, comprising:
   capturing means for capturing said object, said capturing means including a centralizing means for guiding said object to a center of said capturing means, said centralizing means guiding said object through movement in at least three directions, and means for pulling said object into said capturing means once said object has been guided to said center of capturing means;
   driving means for generating power for driving said centralizing means;
   transmission means for transmitting said driving power generated by said driving means to said centralizing means;
   means for detecting at least one of a force and a torque applied to said centralizing means, said detecting means having at least three strain gauges provided respectively at three different portions on said centralizing means and a receiving/transmitting means for receiving signals indicative of at least one of said force and torque from said at least three strain gauges and for transmitting detection signals indicative of at least one of said force and torque being applied to said centralizing means; and
   control means for controlling an output from said driving means, wherein said control means is continuously responsive to said detection signals from said detecting means during operation of said capturing means so as to continuously control said output from said driving means thereby restraining a velocity of said centralizing means relative to said object.

8. An end effector as set forth in claim 7, wherein said centralizing means includes a stationary ring, a rotary ring and a plurality of snare cables each connected at one end to said stationary ring and at the other end to said rotary ring.

9. An end effector according to claim 7, wherein said control means controls said output from said driving means so as to maintain said detection signals within a predetermined level.

10. An end effector secured to a front end of a manipulator arm in a remote control system and having a function for clamping an object, comprising:
    capturing means for capturing said object, said capturing means including a centralizing means for guiding said object to a center of said capturing means, said centralizing means guiding said object through movement in at least three directions, and means for pulling said object into said capturing means once said object has been guided to said center of capturing means;
    driving means for generating power for driving said capturing means;
    transmission means for transmitting said driving power generated by said driving means to said capturing means;
    means for detecting at least one of a force and a torque applied to said capturing means, said detecting means including a plurality of strain gauges and means for amplifying outputs from said plurality of strain gauges, wherein said detecting means continuously produces detection signals indicative of at least one of said force and said torque during operation of said capturing means; and
    control means for controlling an output from said driving means, wherein said control means is continuously responsive to said detection signals from said detecting means during operation of said capturing means so as to continuously control said output from said driving means, thereby restraining a speed of said capturing means relative to said object.

11. An end effector according to claim 10, wherein said control means controls said output from said driving means so as to maintain said detection signals within a predetermined level.

* * * * *